Sept. 2, 1930.  C. DUNNING  1,775,036

DEHYDRATOR

Filed Dec. 13, 1926

CLAUDE DUNNING
INVENTOR
PER Albert J. Fike
ATTORNEY.

Patented Sept. 2, 1930

1,775,036

UNITED STATES PATENT OFFICE

CLAUDE DUNNING, OF LOS ANGELES, CALIFORNIA

DEHYDRATOR

Application filed December 13, 1926. Serial No. 154,541.

This invention relates to improvements in dehydraters, and has for one of its principal objects the provision of a dehydrating or evaporating apparatus which will effectually evaporate solutions in liquids without spoiling the resultant product, as well as retaining the original flavor, as, for example, when fruit and vegetable juices are concentrated by this means.

Another important object of this invention is to provide means for reducing the water content of a solution by evaporation through air contact, and without heating the solution.

Still another and further object of this invention is to provide, in a dehydrater, means for quickly and effectively paring off moisture and continuously subjecting a solution to the action of absorptive air currents.

Another and still further important object of this invention is to provide, in a dryer or dehydrater, means for subjecting solutions and liquids in very thin layers and in small drops to the action of a drying agency.

Other and further important objects of the invention will be apparent from the disclosures in the accompanying drawings and following specification.

The invention, in a preferred form, is illustrated in the drawings and hereinafter more fully described.

Figure 1:
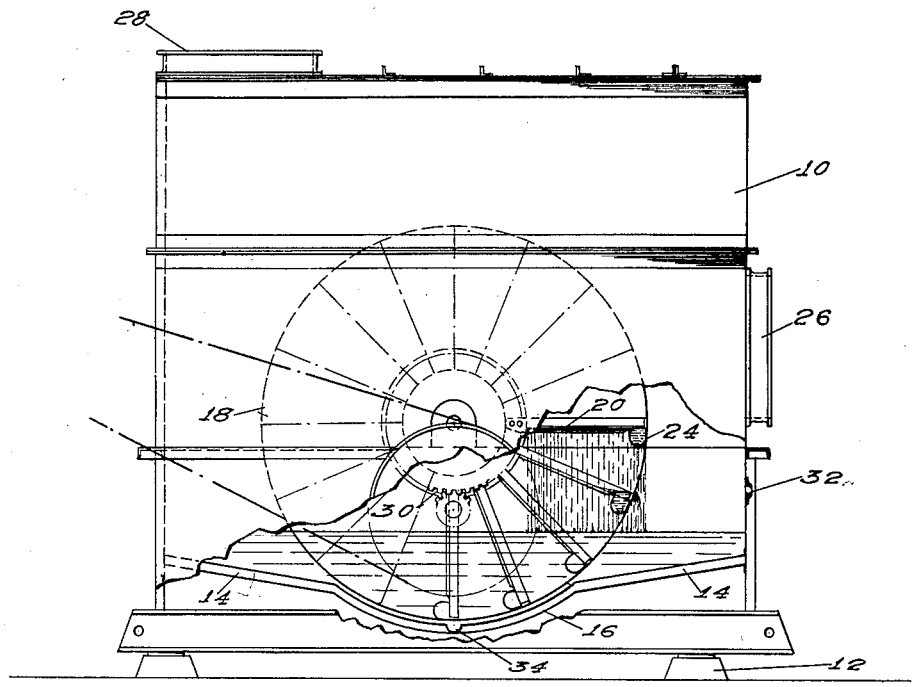
Figure 1 is a side elevation of the improved dehydrater of this invention, parts being broken away to show the interior construction.

The reference numeral 10 indicates generally a casing comprising the evaporator of this invention, mounted on suitable supports 12.

As shown in Figure 1, the bottom 14 of the casing is inclined toward the center, thereby adapted to deliver solutions or other liquids to an arcuate trough 16 adapted to co-operate with the periphery of a drying wheel 18, the drying wheel itself comprising a series of radially arranged screens 20 for evaporating purposes. The periphery of the drum is preferably composed of a plurality of solid metal bands 17.

Figure 2:
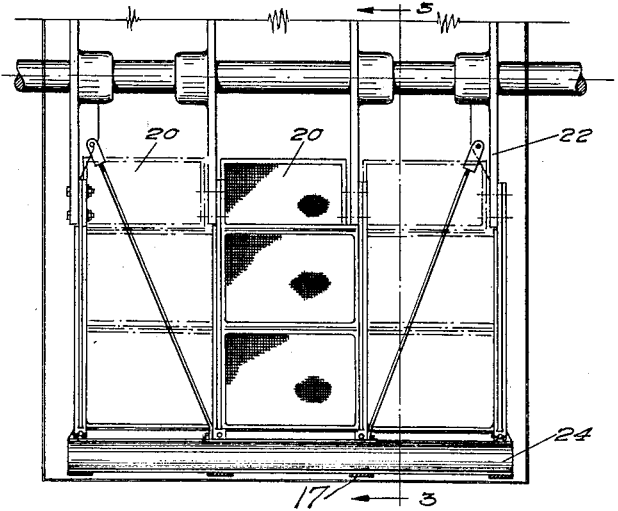
Figure 2 is a front elevation of one of the evaporating screens forming a portion of the drying drum, certain parts being omitted.
Figure 3:
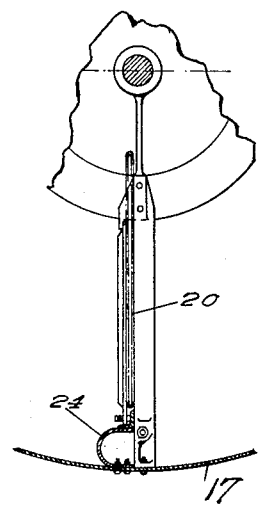
Figure 3 is a sectional view taken on the line 3—3 of Figure 2.

As shown in Figure 2, the screens 20 are mounted on suitable frames 22 and are formed in sections for greater strength and rigidity.

At the periphery of the wheel and adjacent each screen is a scoop 24 whereby liquid is raised from the trough 16 and carried upwardly by the rotative motion of the wheel 18, as shown in Figure 1.

Part of the liquid in the troughs or buckets 24 is spilled back into the solution upon the motion of the wheel or drum 18, but after each screen 20 has passed the horizontal the remainder of the contents of each bucket 24 will be delivered over the screen 20 and will flow in thin sheets thereover, and at the same time drip downwardly onto the next succeeding screen, this action continuing throughout the rotation of the drum 18.

An inlet for air is provided at 26, and this air may be either cool or warm, and after the same is passed over the layers of the solution in the troughs and screens and through the droplets thereof dripping from the wheel or drum, it is passed out through a suitable opening 28 in the top of the case 10 carrying moisture in suspension, and this action is continued until the desired degree of concentration of the solution is reached.

Suitable means in the form of gears 30 are provided for rotating the drum, and an inlet for the solution is mounted on the side of the casing 10 as shown at 32.

After the solution is properly concentrated it can be drawn off by means of a spigot leading from a narrow gutter or the like 34 formed in the bottom of the arcuate trough 16.

It will be seen that herein is provided a dehydrater or evaporator which is economical of construction, extremely simple in operation, and effective as to results.

I am aware that many changes may be made and numerous details of construction varied throughout a wide range without departing from the principles of this invention, and I therefore do not purpose limiting the patent granted hereon otherwise than as necessitated by the prior art.

I claim as my invention:

A dehydrater and evaporator, comprising a casing, a drum rotatably positioned transversely of the casing, means for passing a current of drying air through the casing, and against the periphery of the drum, the casing being provided with an inlet opening for such drying air adjacent one cylindrical surface of the drum, and with an outlet opening for the air above and across the drum from the inlet opening, a series of radial supports extending outwardly from the axis of the drum to the periphery thereof, a plurality of screens mounted on each of said radial supports, and means for delivering liquid to be evaporated in thin sheets over each of said screens, said means comprising a trough at the end of each radial support and extending transversely of the drum adjacent its periphery, the upper inner edge of each trough being in the same plane as the plane of its corresponding evaporating screen, and means for assuring a continuous supply of liquid to the troughs upon rotation of the drum, said means including a bottom in the casing sloping from both ends thereof toward the middle directly beneath the axis of the drum, said bottom having a trough formed therein of substantially the same curvature as the curvature of the drum and adjacent therewith for approximately one-fourth of its peripheral surface, and a further deeper indentation in the bottom of said trough for collecting concentrated liquid to be withdrawn.

In testimony whereof I affix my signature.

CLAUDE DUNNING.